(12) United States Patent
Inoue

(10) Patent No.: US 8,768,340 B2
(45) Date of Patent: Jul. 1, 2014

(54) MOBILE COMMUNICATION TERMINAL TESTING APPARATUS AND METHOD OF TESTING MOBILE COMMUNICATION TERMINAL

(75) Inventor: Naoki Inoue, Atsugi (JP)

(73) Assignee: Anritsu Corporation, Atsugi-Shi (JP)

( * ) Notice: Subject to any disclaimer, the term of this patent is extended or adjusted under 35 U.S.C. 154(b) by 342 days.

(21) Appl. No.: 13/370,622

(22) Filed: Feb. 10, 2012

(65) Prior Publication Data

US 2012/0212492 A1 Aug. 23, 2012

(30) Foreign Application Priority Data

Feb. 17, 2011 (JP) ................................. 2011-032275

(51) Int. Cl.
*H04B 17/00* (2006.01)
*G09G 5/00* (2006.01)

(52) U.S. Cl.
CPC .................................. *H04B 17/0065* (2013.01)
USPC ...................... 455/423; 455/67.11; 455/115.1; 345/619

(58) Field of Classification Search
CPC ........ H04W 24/00; H04W 16/00; H04B 7/00; H04B 17/00
USPC .................... 455/423, 67.1–67.4, 115, 226.1; 375/224; 370/241; 345/619, 622; 703/13
See application file for complete search history.

(56) References Cited

U.S. PATENT DOCUMENTS

| | | | |
|---|---|---|---|
| 7,751,470 B2 | 7/2010 | Stanton et al. | |
| 7,877,060 B1 * | 1/2011 | Khlat et al. | 455/63.1 |
| 7,995,647 B2 | 8/2011 | Akita | |
| 8,446,833 B2 * | 5/2013 | Ogata et al. | 370/241 |
| 2006/0279314 A1 * | 12/2006 | Park et al. | 324/765 |
| 2008/0019421 A1 * | 1/2008 | Dias et al. | 375/132 |
| 2011/0190025 A1 * | 8/2011 | Kim et al. | 455/522 |

FOREIGN PATENT DOCUMENTS

| | | |
|---|---|---|
| JP | 2003046431 A | 2/2003 |
| JP | 2005-303455 A | 10/2005 |
| JP | 2010-118797 A | 5/2010 |
| JP | 2010-119065 A | 5/2010 |

OTHER PUBLICATIONS

3GPP TR 25.814, "Physical layer aspects for evolved Universal Terrestrial Radio Access," 2006.
3GPP TS 36. 521-1, "PUSCH-EVM with exclusion period", § 6. 5. 2. A1, pp. 1-17 & 118-120, 2011.

* cited by examiner

*Primary Examiner* — Nizar Sivji
(74) *Attorney, Agent, or Firm* — Pearne & Gordon LLP

(57) ABSTRACT

There are provided a mobile communication terminal testing apparatus and a method of testing a mobile communication terminal capable of displaying an EVM for each slot. A mobile communication terminal testing apparatus 1 includes a reception unit 12 that receives a transmission signal of a radio frequency from a mobile communication terminal 2, converts the transmission signal into a baseband signal, and outputs the baseband signal as a reception signal having a digital value, an EVM measuring circuit 22 that measures the modulation accuracy of each symbol included in the reception signal, a slot selecting section 32 that selects at least one of a plurality of slots, and a display unit 43 that displays the EVM of each symbol included in the slot selected by the slot selecting section 32.

24 Claims, 12 Drawing Sheets

| SLOT | EXCLUSION PERIOD: REAL TIME ($\mu$s) HEAD | EXCLUSION PERIOD: REAL TIME ($\mu$s) TAIL | NUMBER OF RBs | CONDITION |
|---|---|---|---|---|
| 4 | 25 | – | 12 | POWER OFF → ON |
| 5 | – | 25 | 12 | NUMBER OF RBs IS CHANGED ON BOUNDARY OF SUB FRAMES |
| 6 | 25 | – | 1 | NUMBER OF RBs IS CHANGED ON BOUNDARY OF SUB FRAMES |
| 7 | – | 5 | 1 | POWER ON → OFF |
| 14 | 25 | – | 1 | POWER OFF → ON |
| 15 | – | 25 | 1 | NUMBER OF RBs IS CHANGED ON BOUNDARY OF SUB FRAMES |
| 16 | 25 | – | 12 | NUMBER OF RBs IS CHANGED ON BOUNDARY OF SUB FRAMES |
| 17 | – | 5 | 12 | POWER ON → OFF |

| SLOT | 4 | 5 | 6 | 7 | 14 | 15 | 16 | 17 |
|---|---|---|---|---|---|---|---|---|
| MEASUREMENT COUNT | 1 | 2 | 3 | 4 | 5 | 6 | 7 | 8 |
| | 9 | 10 | 11 | 12 | 13 | 14 | 15 | 16 |

AVERAGING

| SLOT | 4 | 5 | 6 | 7 | 14 | 15 | 16 | 17 |
|---|---|---|---|---|---|---|---|---|
| MEASUREMENT COUNT | 1 | 2 | 3 | 4 | 5 | 6 | 7 | 8 |
| | 9 | 10 | 11 | 12 | 13 | 14 | 15 | 16 |
| | AVERAGING1 | AVERAGING2 | AVERAGING3 | AVERAGING4 | AVERAGING5 | AVERAGING6 | AVERAGING7 | AVERAGING8 |

US 8,768,340 B2

MOBILE COMMUNICATION TERMINAL TESTING APPARATUS AND METHOD OF TESTING MOBILE COMMUNICATION TERMINAL

TECHNICAL FIELD

The present invention relates to a mobile communication terminal testing apparatus and method of testing a mobile communication terminal for testing a mobile communication terminal such as a cellular phone or a mobile terminal.

BACKGROUND ART

Conventionally, as a mobile communication terminal testing apparatus of this type, for example, one disclosed in Patent Document 1 is known. This mobile communication terminal testing apparatus includes a transmission circuit that transmits a signal to a mobile communication terminal and a reception circuit that receives a signal from the mobile communication terminal and is configured so as to test a mobile communication terminal by operating as a pseudo base station that transmits or receives signals to/from the mobile communication terminal. In Patent Document 1, as communication modes used by a mobile communication terminal, a code division multiple access (CDMA) type and a wideband-code division multiple access (W-CDMA) type are described.

As a next-generation telecommunication standard of the W-CDMA, a communication standard called long term evolution (LTE) according to the third generation partnership project (3GPP) has been reviewed and at present has started to be introduced. In the LTE, the orthogonal frequency division multiple access (OFDMA) is employed for a downlink, and the single carrier-frequency division multiple access (SC-FDMA) is employed for an uplink (for example, see Non-Patent Document 1).

The OFDMA is a type in which a frequency band is divided into a plurality of narrow frequency bands (subcarriers), and transmission is performed by carrying data on each frequency band, and, by densely arranging the subcarriers in frequencies without interfering with each other while partly overlapping each other, high-speed transmission is realized, whereby the use efficiency of the frequency can be increased.

The SC-FDMA is a transmission type in which a frequency band is divided, and transmission is performed among a plurality of terminals using frequency bands different from each other, whereby the interference among the mobile communication terminals can be reduced. According to the SC-FDMA, a variation in the transmission power is decreased, whereby low power consumption of the terminals and a wide coverage can be realized.

In this SC-FDMA, a digital signal is transmitted in a format as illustrated in FIG. 12. In other words, in the time axis direction, slots each configured by seven SC-FDMA symbols and having a time width of 0.5 ms (milliseconds) are formed so as to be adjacent to each other. One subframe is configured by two slots, and one frame is configured by ten subframes.

In addition, each slot is divided in the frequency axis direction into a plurality of blocks used for allocating frequency bands. One resource block (hereinafter, abbreviated as "RB") is configured by 12 subcarriers (180 kHz) having an interval of 15 kHz as a unit in the frequency axis direction. According to the SC-FDMA, the RB is configured to be dynamically allocated to each mobile communication terminal. FIG. 12 illustrates an example in which RBs are respectively allocated to four mobile communication terminals UE1 to UE4.

As a test standard of a mobile communication terminal using the SC-FDMA, a test relating to an error vector magnitude (EVM: modulation accuracy) is defined (for example, see Non-Patent Document 2). In this test, two frames are measured by using a test pattern in which signals of eight slots are defined in one frame, and an average value of the EVMs corresponding to a total of 16 slots is acquired together. In a conventional mobile communication terminal testing apparatus, the EVM of a mobile communication terminal is evaluated based on this test standard.

RELATED ART DOCUMENT

Patent Document

[Patent Document 1] JP-A-2003-46431

Non-Patent Document

[Non-Patent Document 1] 3GPP TR 25. 814, "Physical layer aspects for evolved Universal Terrestrial Radio Access"
[Non-Patent Document 2] 3GPP TS 36. 521-1 6. 5. 2. 1 A, "PUSCH-EVM with exclusion period"

DISCLOSURE OF THE INVENTION

Problem that the Invention is to Solve

However, since a conventional mobile communication terminal testing apparatus is configured to acquire an average value of the EVMs corresponding to 16 slots together, there is a problem in that it is difficult to represent the value of the EVM of each slot to a tester. Therefore, according to the conventional mobile communication terminal testing apparatus, there are cases where a detailed analysis, detection of a defect, or the like is not sufficiently performed in a development stage of the mobile communication terminal or an evaluation stage in a manufacturing line, and the improvement thereof is desirable.

The present invention is contrived in consideration of the above-described situations, and the object thereof is to provide a mobile communication terminal testing apparatus and a method of testing a mobile communication terminal that are capable of displaying the EVM for each slot.

Means for Solving the Problems

According to an aspect of the present invention, there is provided a mobile communication terminal testing apparatus that tests a mobile communication terminal that transmits or receives a signal of a radio frequency which includes a plurality of slots delimited at a predetermined time interval, each of the slot including a plurality of symbols modulated according to a predetermined modulation scheme. The mobile communication terminal testing apparatus includes: reception signal outputting means that receives a transmission signal of the radio frequency from the mobile communication terminal, converts the transmission signal into a baseband signal, and outputs the baseband signal; modulation accuracy measuring means that measures the modulation accuracy of each of the plurality of symbols included in the baseband signal; slot selecting means that selects at least one of the plurality of slots; and display means that displays the modulation accuracy of each of the plurality of symbols included in the slot that is selected by the slot selecting means.

By employing such a configuration, in the mobile communication terminal testing apparatus according to the present invention, the display means displays the EVM of each symbol included in the slot selected by the slot selecting means, and accordingly, the EVM can be displayed for each slot.

In a mobile communication terminal testing apparatus according to another aspect of the present invention, the display means is configured to display modulation accuracy graphs of the plurality of symbols included in the slot selected by the slot selecting means.

By employing such a configuration, the mobile communication terminal testing apparatus according to the present invention can display the EVM graph of each symbol for each slot.

In a mobile communication terminal testing apparatus according to another aspect of the present invention, the modulation accuracy measuring means measures the modulation accuracy of a measurement target symbol set in advance out of the plurality of symbols included in the slot, and the display means is configured to display a display area in which a measurement period having the measurement target symbol included therein and exclusion periods having no measurement target symbol included therein are displayed in a distinguished manner.

By employing such a configuration, the mobile communication terminal testing apparatus according to the present invention can display the measurement period of the EVM and the exclusion period thereof in a distinguished manner.

In a mobile communication terminal testing apparatus according to another aspect of the present invention, the mobile communication terminal transmits the transmission signal in which a plurality of the symbols modulated according to the predetermined modulation scheme are allocated to areas set in advance in both time domain and frequency domain, and the display means is configured to display a display area in which an allocation area, to which the transmission signal is allocated, and a non-allocation area other than the allocation area are displayed in a distinguished manner.

By employing such a configuration, the mobile communication terminal testing apparatus according to the present invention can display the allocation area of the transmission signal and the non-allocation area thereof in a distinguished manner.

In a mobile communication terminal testing apparatus according to another aspect of the present invention, the display means is configured to display a display area of a graph that represents the allocation number of the allocation areas to which the transmission signal is allocated for each slot and allows the slot selecting means to select an arbitrary slot.

By employing such a configuration, even in a case where the number of areas allocated to each slot is dynamically changed, the mobile communication terminal testing apparatus according to the present invention can allow a tester to intuitively perceive the allocation situation of the area when the tester selects the slot.

According to another aspect of the present invention, there is provided a method of testing a mobile communication terminal that transmits or receives a signal of a radio frequency which includes a plurality of slots delimited at a predetermined time interval, each of the slot including a plurality of symbols modulated according to a predetermined modulation scheme. The method is configured to include: receiving a transmission signal of the radio frequency from the mobile communication terminal, converting the transmission signal into a baseband signal, and inputting the baseband signal; measuring the modulation accuracy of each of the plurality of symbols included in the baseband signal; selecting at least one of the plurality of slots; and displaying the modulation accuracy of each of the plurality of symbols included in the slot that is selected in the selecting of at least one of the plurality of slots.

By employing such a configuration, in the method of testing a mobile communication terminal according to the present invention, the EVM of each symbol included in the slot selected in the selecting of at least one of the plurality of slots is displayed in the displaying of the modulation accuracy, and accordingly, the EVM can be displayed for each slot.

Advantage of the Invention

The present invention can provide a mobile communication terminal testing apparatus and a method of testing a mobile communication terminal that have an advantage of capable of displaying the EVM for each slot.

BRIEF DESCRIPTION OF THE DRAWINGS

FIG. 2 is a schematic diagram illustrating each slot of the EVM test pattern transmitted by a mobile communication terminal as a test target for a mobile communication terminal testing apparatus according to an embodiment of the present invention.

FIG. 11 relates to the calculation of an average value of EVMs in a mobile communication terminal testing apparatus according to an embodiment of the present invention, which is compared with a conventional case.

BEST MODE FOR CARRYING OUT THE INVENTION

First, before an embodiment of the present invention is described, a test pattern for measuring an EVM (hereinafter, referred to as an "EVM test pattern") in the LTE that is defined in "3GPP TS 36.521-1 6.5.2.1A" will be described.

Figure 1:
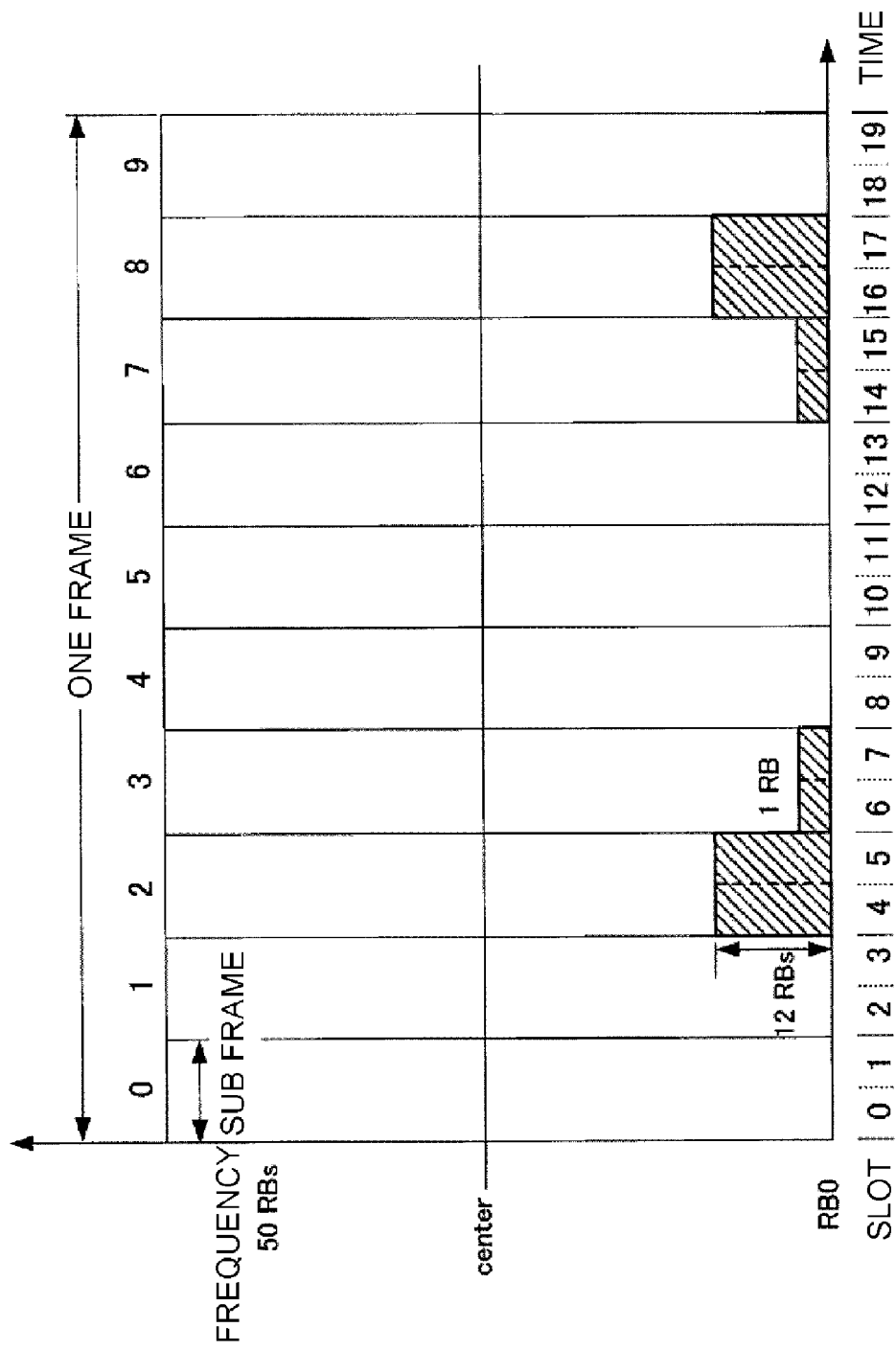
FIG. 1 is a schematic diagram illustrating an EVM test pattern transmitted by a mobile communication terminal as a test target for a mobile communication terminal testing apparatus according to an embodiment of the present invention.

As illustrated in FIG. 1, the EVM test pattern is defined as one frame. One frame includes 10 subframes (from subframes 0 to 9). Each subframe includes two slots. In other words, one frame is configured by 20 slots from slot 0 to slot 19.

For example, in a case where the channel bandwidth of a channel is 10 MHz, each one of 20 slots includes an area to which 50 RBs can be allocated in the frequency-axis direction. Out of the slots, a predetermined number of RBs are allocated to slots 4 to 7 and 14 to 17 denoted by diagonal lines. Thus, in the EVM test pattern, areas denoted by diagonal lines are allocation areas, and the other areas are non-allocation area.

To slots 4 to 7 and 14 to 17, a predetermined number of RBs illustrated in FIG. 2 are allocated. In addition, 12 RBs are allocated to each one of slots 4, 5, 16, and 17, and one RB is allocated to slots 6, 7, 14, and 15. In addition, in each slot to which RBs are allocated, at the head or the tail, an exclusion period that is a non-target for the measurement of the EVM is arranged. This exclusion period is arranged in real time, and, for example, there is an exclusion period of 25 μs (microseconds) at the head in slot 4.

Since the EVM test pattern is configured as described above, the EVM can be measured in the conditions illustrated in FIG. 2 by using the EVM test pattern. For example, an EVM in a case where power is changed from the Off state to the On state can be measured in the data of slot 4 to which 12 RBs are allocated. In addition, for example, an EVM in a case where the number of RBs is changed from 12 to 1 in the boundary of the subframes can be measured in the data of slot 6 to which one RB is allocated.

Figure 3:
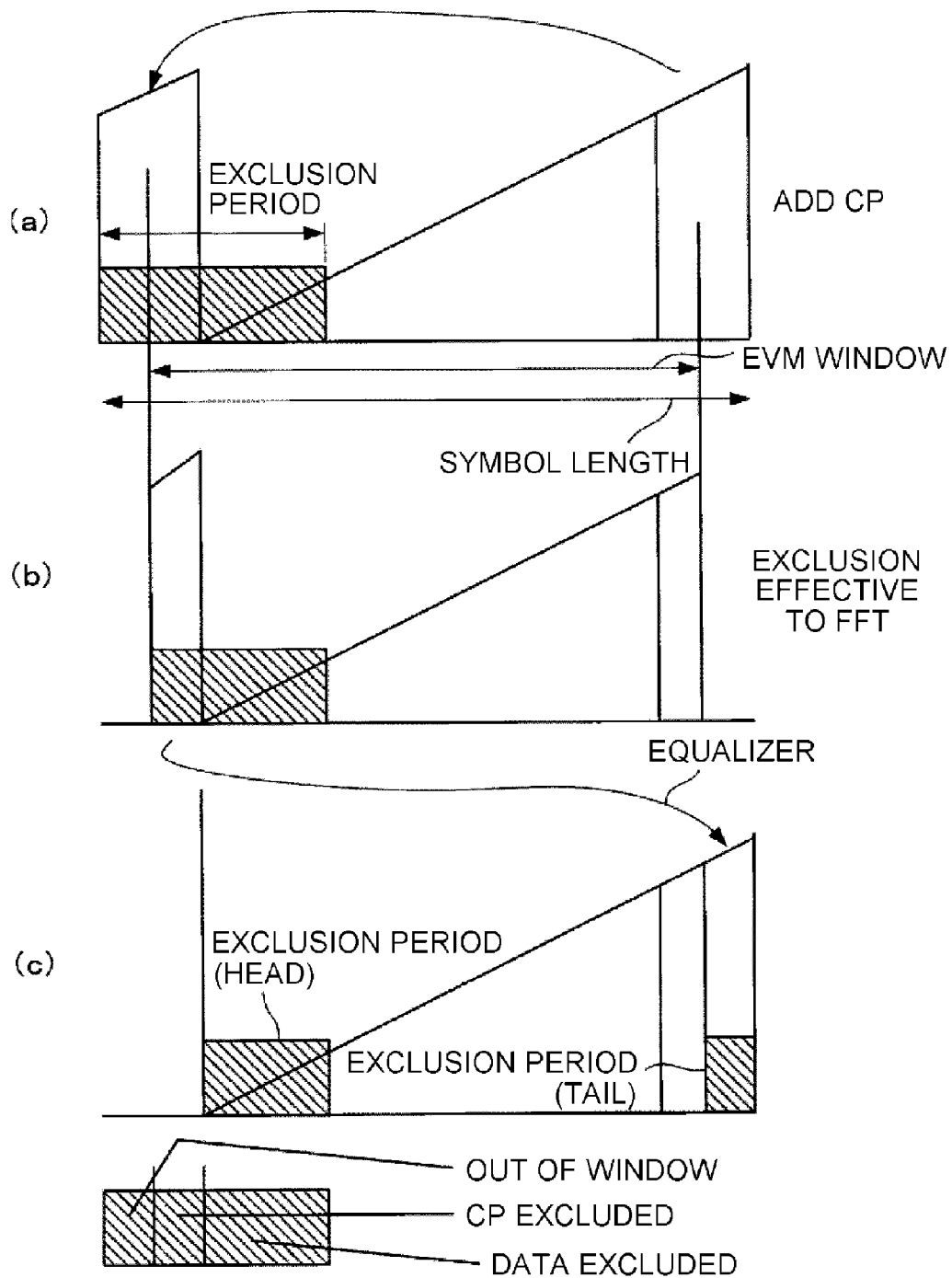
FIG. 3 is a schematic diagram illustrating exclusion periods in a mobile communication terminal testing apparatus according to an embodiment of the present invention.

The above-described exclusion period is described under the title of "EVM with exclusion period" in Appendix E.7 of "3GPP TS 36.521-1". Here, it will be briefly described with reference to FIG. 3. In the measurement of the EVM, the measurement of the head side (Early EVM) and the measurement of the tail side (Late EVM) are performed, and the value of the worst side is used. Hereinafter, the description thereof will not be presented.

In order to decrease the influence of multipath in wireless communication, the tail of the data is copied and is inserted to the head as a cyclic prefix (CP). FIG. 3(a) illustrates a case where an exclusion period is disposed at the head of the data, and, for example, an exclusion period of 25 μs is included at the head of the data in slot 4. In addition, FIG. 3(b) illustrates an exclusion period as a target of an FFT process. When the data is transformed from the frequency domain to the quasi time domain by an IDFT process, as illustrated in FIG. 3(c), the exclusion period is divided into two disposed at the head and the tail. Each divided exclusion period is represented by the number of symbols. Regarding the dividing of the exclusion period, a calculation equation is represented in "E.7.4 Formula". For example, for the above-described Early EVM, in the case of slot 4, the exclusion period of 25 μs disposed at the head in the time domain has 44 symbols at the head and 10 symbols at the tail in the quasi time domain. However, this value is a value in a case where the channel bandwidth of the LTE is 10 MHz.

Next, the configuration of a mobile communication terminal testing apparatus according to an embodiment of the present invention will be described. In the description presented below, an example will be described in which the mobile communication terminal testing apparatus according to an embodiment of the present invention tests a mobile communication terminal that communicates based on the communication standard of the LTE.

Figure 4:
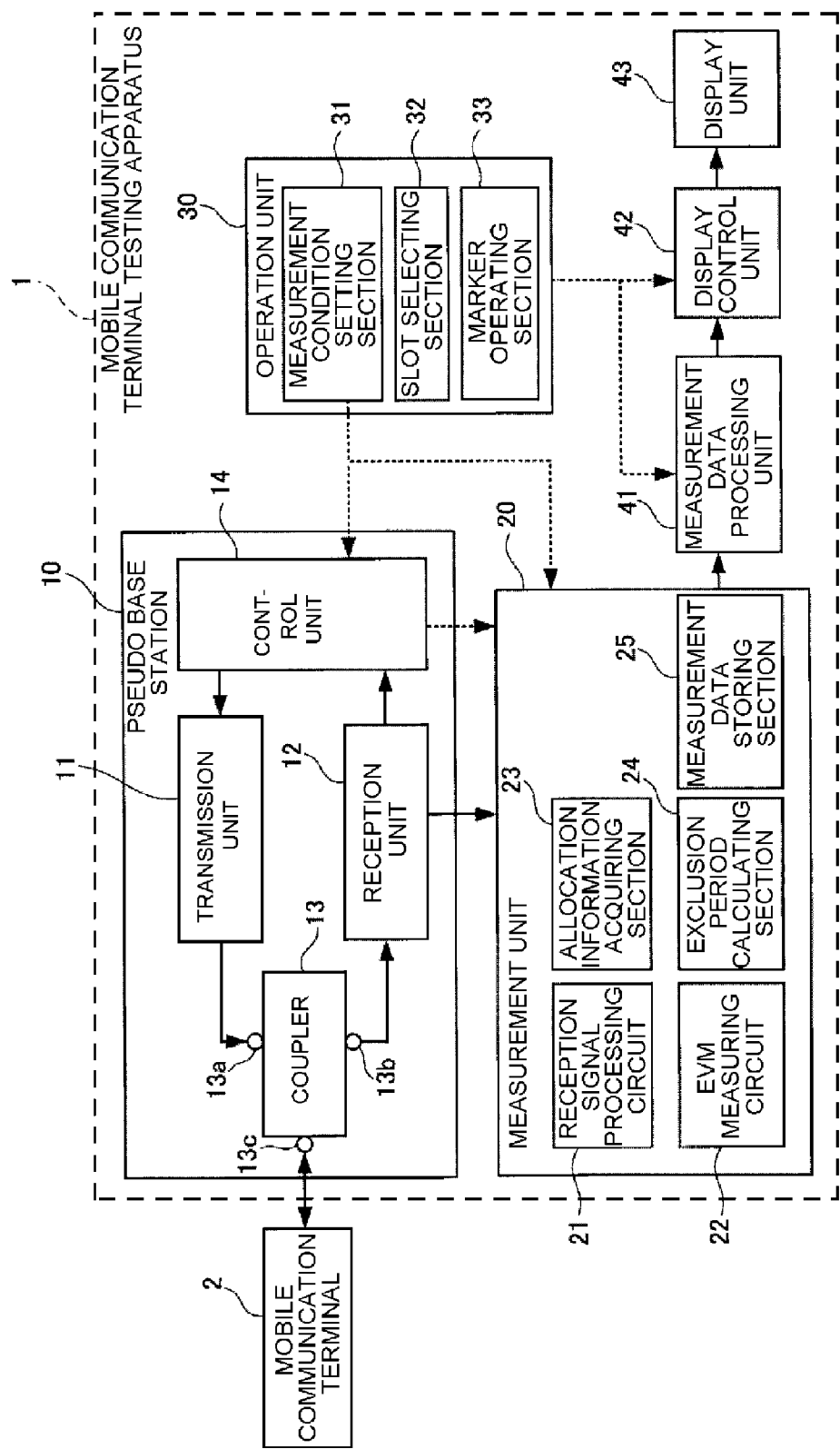
FIG. 4 is a diagram illustrating the block configuration of a mobile communication terminal testing apparatus according to an embodiment of the present invention.

As illustrated in FIG. 4, the mobile communication terminal testing apparatus 1 according to this embodiment tests a mobile communication terminal 2 and includes a pseudo base station 10, a measurement unit 20, an operation unit 30, a measurement data processing unit 41, a display control unit 42, and a display unit 43.

The pseudo base station 10 includes a transmission unit 11, a reception unit 12, a coupler 13, and a control unit 14.

The transmission unit 11 is configured to modulate a carrier of a frequency designated by the control unit 14 and output the modulated carrier to the coupler 13 as a base station signal. The operation of the transmission unit 11 is controlled by the control unit 14.

The reception unit 12 is configured to receive a signal transmitted from the mobile communication terminal 2 as a test target terminal through the coupler 13. In addition, the reception unit 12 is configured to demodulate the received signal to be a baseband signal and convert the baseband signal into a digital value. The baseband signal converted into a digital value is output to the measurement unit 20. In addition, the operation of the reception unit 12 is controlled by the control unit 14. Furthermore, the reception unit 12 configures reception signal outputting means according to the present invention.

The coupler 13 includes a terminal 13a connected to the transmission unit 11, a terminal 13b connected to the reception unit 12, and a terminal 13c connected to the mobile communication terminal 2. According to this configuration, the coupler 13 is configured to receive a transmission signal transmitted from the transmission unit 11 by using the terminal 13a and output the signal to the mobile communication terminal 2 from the terminal 13c, and receives a signal transmitted from the mobile communication terminal 2 by using the terminal 13c and output the signal to the reception unit 12 from the terminal 13b.

The control unit 14 is configured to control the operations of the transmission unit 11, the reception unit 12, and the coupler 13 based on measurement conditions set by the operation unit 30 to be described later. In addition, the control unit 14 acquires allocation information used for allocating an RB to the mobile communication terminal 2 and is configured to output the allocation information to the measurement unit 20. Hereinafter, it is assumed that the mobile communication terminal testing apparatus 1 tests the mobile communication terminal 2 by transmitting a signal having the above-described EVM test pattern to the mobile communication terminal 2 by using the control unit 14. In such a case, the control unit 14 acquires time information of the exclusion period (time domain) of the EVM test pattern and is configured to output the time information of the exclusion period (time domain) to the measurement unit 20.

The measurement unit 20 includes a reception signal processing circuit 21, an EVM measuring circuit 22, an allocation information acquiring section 23, an exclusion period calculating section 24, and a measurement data storing section 25.

The reception signal processing circuit 21 is configured to receive the baseband signal of a digital value relating to the EVM test pattern from the reception unit 12 and perform predetermined signal processing for measuring an EVM for the EVM test pattern. For example, the reception signal processing circuit 21 includes an FFT circuit that converts the baseband signal of the time domain into a signal of the frequency domain, an IDFT circuit that converts a signal of the frequency domain into a signal of the quasi time domain, and the like.

For slots 4 to 7 and 14 to 17 of the EVM test pattern, the EVM measuring circuit 22 is configured to measure an EVM of each symbol included in each slot for each slot. This EVM measuring circuit 22 configures modulation accuracy measuring means according to the present invention.

The allocation information acquiring section 23 is configured to acquire the allocation information from the control unit 14.

The exclusion period calculating section 24 is configured to acquire the time information of the exclusion period (time domain) from the control unit 14 and calculate the number of symbols of the exclusion period (quasi time domain) based on the measurement conditions set by the operation unit 30 to be described later and the above-described calculation equation described in "E.7.4 Formula".

The measurement data storing section 25 is configured to store data of the EVM measured by the EVM measuring circuit 22, data of the exclusion period, the allocation information, and the like.

The operation unit 30 is operated by a tester and includes a measurement condition setting section 31, a slot selecting section 32, and a marker operating section 33. More specifically, for example, the operation unit 30 is configured by a display that displays a setting screen used for setting various measurement conditions, an input device such as a display, a keyboard, a dial, or a mouse, a control circuit that controls the display and the input device, and the like.

In order to transmit the data of the EVM test pattern to the mobile communication terminal 2, the measurement condition setting section 31 is configured to set a communication standard (here, the LTE) and a modulation scheme (for example, QPSK), a channel bandwidth, the arrangement slot of the RBs and the number of the RBs, which are allocated to the mobile communication terminal 2, the measurement count of the EVM for one slot, and the like. In addition, the measurement condition setting section 31 is also configured to set the display form of the measurement result on the display unit 43, for example, a numeric value display or a graph display of various measured values, a distinguished display of a predetermined item, or the like through the display control unit 42 to be described later.

The slot selecting section 32, for example, is configured by a screen on which a list of slots is displayed and a slot selecting button that is used for a tester selecting at least one slot. As the slot selecting button is pressed by a tester, the EVM measurement data of a desired slot is configured to be displayed on the display unit 43 to be described later. In addition, the slot selecting section 32 configures slot selecting means according to the present invention.

The marker operating section 33, for example, in one slot, is operated by a tester so as to designate a symbol for the EVM measurement.

The measurement data processing unit 41 is configured to perform, for example, calculation of an average value of EVMs for each slot at a predetermined measurement count, reading the EVM measurement data of the symbol designated by the marker operating section 33, and the like for the EVM measurement data stored in the measurement data storing section 25.

The display control unit 42 receives the EVM measurement data from the measurement data processing unit 41 and is controlled to display the EVM measurement data of the slot selected by the slot selecting section 32 and the like on the display unit 43 in a display form set by the measurement condition setting section 31. In addition, the display control unit 42 is configured to perform a distinguished display of an allocation area, a non-allocation area, an exclusion period, and the like in a display area 51.

The display unit 43, for example, is configured by a liquid crystal display and is configured to display EVM measurement data according to an EVM test pattern and the like under the control of the display control unit 42. This display unit 43 configures display means according to the present invention. For example, the display unit 43 displays a screen as illustrated in FIG. 5.

Figure 5:
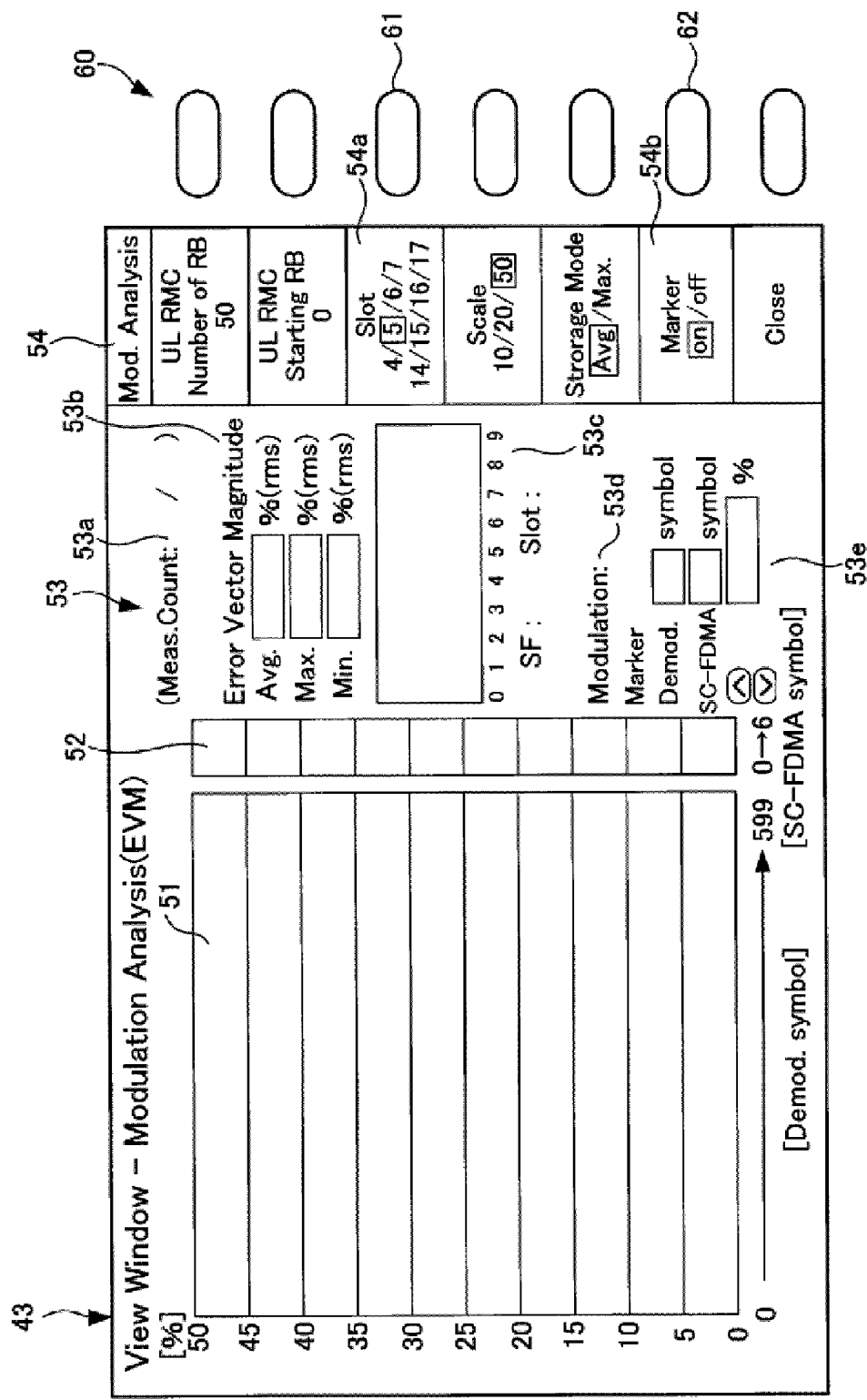
FIG. 5 is a diagram illustrating a screen example displayed by a display unit of a mobile communication terminal testing apparatus according to an embodiment of the present invention.

As illustrated in FIG. 5, the screen displayed by the display unit 43 includes a display area 51 of the EVM in the quasi time domain, a display area 52 of the EVM in the time domain, a display area 53 of various kinds of information, and a display area 54 representing an analysis condition.

In the display area 51, a graph can be displayed in which the horizontal axis is set as the demodulated symbol, the vertical axis is set as the EVM (%), an EVM is represented for each demodulated symbol of the symbol (SC-FDMA symbol) corresponding to a marker position in a predetermined slot. In addition, in the display area 51, an allocation area, a non-allocation area, an exclusion period, and the like are displayed in a distinguishable manner.

In the display area 52, a graph can be displayed in which the horizontal axis is set as the SC-FDMA symbol, the vertical axis is set as the EVM (%), and an EVM is represented for each symbol in the time axis direction of the symbol (demodulated symbol) corresponding to the marker position in a predetermined symbol.

The display area 53 includes a display area 53a in which the measurement count (Meas. Count) is displayed, a display area 53b in which the average value (Avg.), the maximum value (Max.), and the minimum value (Min.) of the EVMs are displayed, a display area 53c of a graph that represents the number of RBs for each slot, and a display area 53d that displays a modulation scheme (Modulation), and a display area 53e in which a symbol (Demod. x symbol) corresponding to a marker position in the display area 51, a symbol (SC-FDMA x symbol) corresponding to the marker position in the display area 52, and an EVM (%) value at the marker position are played.

The display area 54 includes an area 54a in which slots that can be selected and a slot that is currently selected are displayed and a display area 54b in which it is displayed whether the display of a marker is currently the On state or the Off state. The content of this display area 54 is configured to be changed by a tester pressing the operation button 60 arranged on the right side. The operation button 60 includes an operation button 61 that is used for selecting a slot and an operation button 62 that sets the display of a marker to the On state or the Off state. For example, every time the tester presses the operation button 61, the selected slot is configured to be changed such as 4→5→6. In addition, the operation button 60 configures a part of the above-described operation unit 30. Furthermore, the operation button 62 configures a part of the above-described marker operating section 33, and the marker operating section 33 includes a cursor key or a dial (not illustrated in the figure) that sets the position of the marker in addition to the operation button 62.

Next, an example of a display performed by the display unit 43 in a case where the EVM is measured by using the EVM test pattern will be described in detail.

Figure 6:
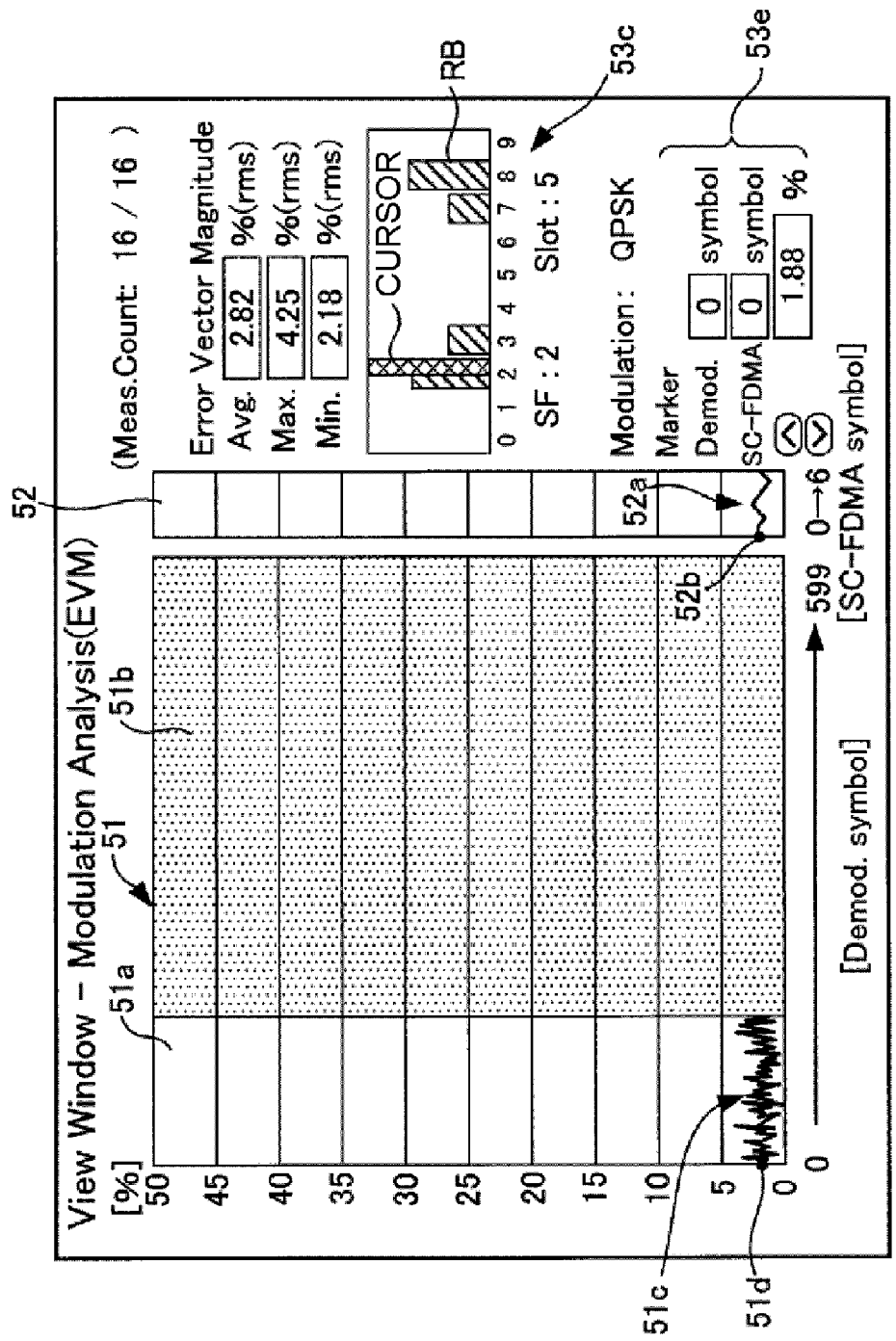
FIG. 6 is an example in which an EVM measurement result of slot 5 is displayed by a display unit of a mobile communication terminal testing apparatus according to an embodiment of the present invention.

FIG. 6 is an example in which the EVM measurement result of slot 5 is displayed. 12 RBs are allocated to slot 5, and an exclusion period of 25 µs is disposed to the tail of the slot (see FIG. 2).

As illustrated in FIG. 6, in the display area 51, an allocation area 51a and a non-allocation area 51b are displayed in a distinguished manner, for example, by coloring them. Here, the horizontal axis of the display area 51 corresponds to 600 (=50 RBs×12 subcarriers) demodulated symbol positions from 0 to 599. Since 12 RBs are allocated to slot 5 (see FIG. 2), the width of the allocation area 51a in the horizontal-axis direction is 144 symbols (12 RBs×12 subcarriers) when represented by the number of demodulated symbols. On the other hand, the width of the non-allocation area 51b in the horizontal-axis direction is 456 symbols (38 RBs×12 subcarriers) when represented by the number of demodulated symbols.

In the allocation area 51a, an EVM graph 51c that represents the EVM measurement results of the demodulated symbols 0 to 143 is drawn. Here, a marker 51d is allocated to demodulated symbol 0.

In the display area 52, an EVM graph 52a that represents the EVM measurement results of SC-FDMA symbols (0 to 6) is drawn. Here, a marker 52b is allocated to SC-FDMA symbol 0.

In the display area 53b, an average value, the maximum value, and the minimum value of 16 slots for which the data of the EVM test patterns corresponding to 2 frames is measured are displayed.

In the display area 53c, the allocation situation of RBs is represented as a graph by the subframe numbers 0 to 9, and, it is represented in a graph and a text that the cursor is currently positioned at slot (Slot) 5 of the second subframe (SF). In addition, in the example illustrated in the figure, although a configuration is employed in which one slot is designated by one cursor, for example, a configuration may be employed in which a plurality of cursors is displayed and selected by the slot selecting section 32, and the EVMs of the plurality of selected slots are simultaneously displayed on the display unit 43.

The display area 53d represents that the modulation scheme of a test target signal is quadrature phase shift keying (QPSK).

The display area 53e represents that markers 51d and 52b are located at symbol 0. In addition, it is represented that the EVM measurement value of the symbol represented by the markers 51d and 52b is 1.88%.

Figure 7:
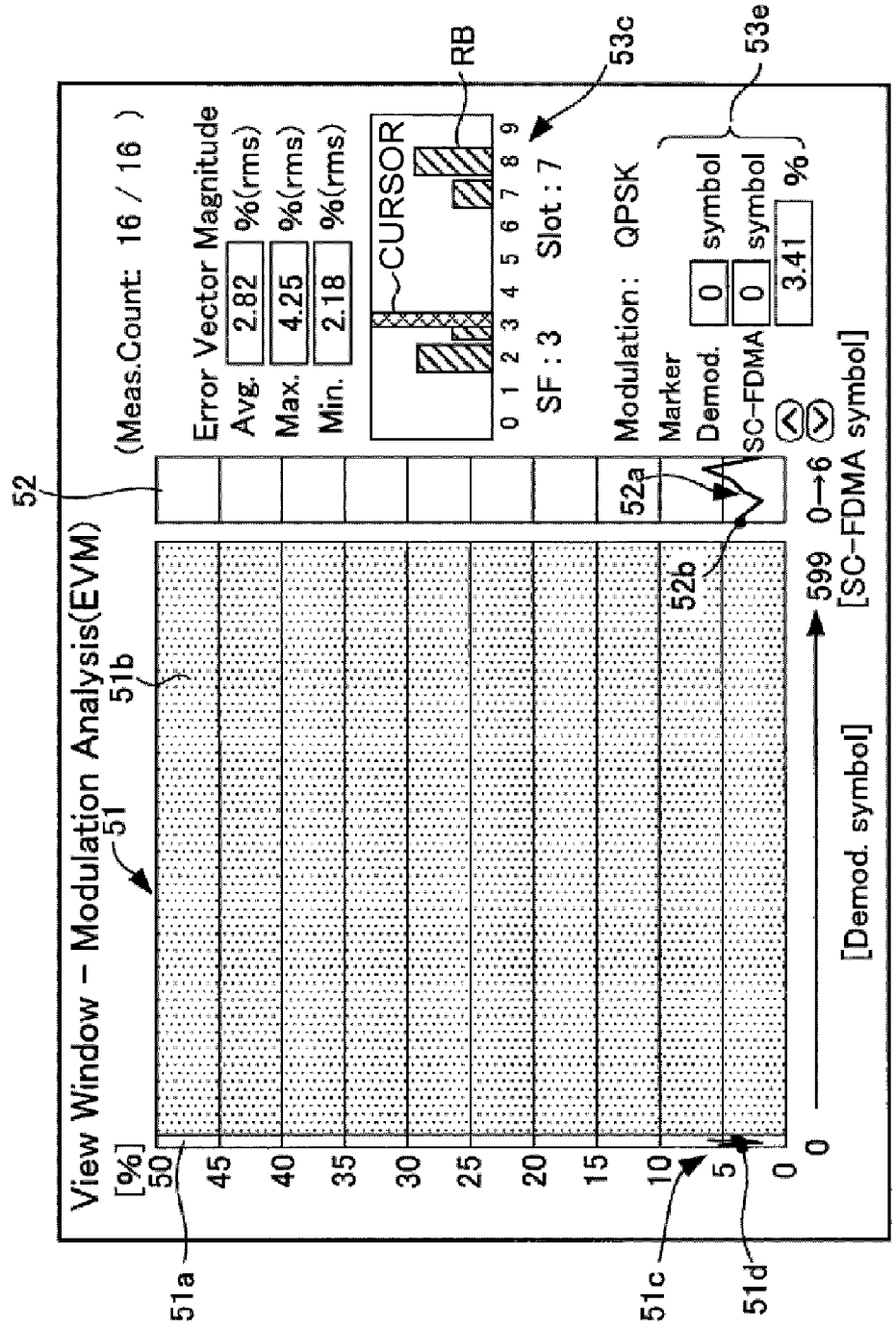
FIG. 7 is an example in which an EVM measurement result of a slot 7 is displayed by a display unit of a mobile communication terminal testing apparatus according to an embodiment of the present invention.

Next, a display example of the EVM measurement result for slot 7 is represented in FIG. 7. One RB is allocated to slot 7, and an exclusion period of 5 µs is arranged at the tail of the slot (see FIG. 2).

As illustrated in FIG. 7, in the display area 51, similarly to the case illustrated in FIG. 6, an allocation area 51a and a non-allocation area 51b are displayed in a distinguished manner, for example, by coloring them. Here, the width of the allocation area 51a in the horizontal-axis direction is 12 symbols (1 RB×12 subcarriers) when represented by the number of demodulated symbols. On the other hand, the width of the non-allocation area 51b in the horizontal-axis direction is 588 symbols (49 RBs×12 subcarriers) when represented by the number of demodulated symbols.

In the allocation area 51a, an EVM graph 51c that represents the EVM measurement results of the demodulated symbols 0 to 11 is drawn. Here, a marker 51d is allocated to demodulated symbol 0.

In the display area 52, an EVM graph 52a that represents the EVM measurement results of SC-FDMA symbols (0 to 6) is drawn. Here, a marker 52b is allocated to SC-FDMA symbol 0.

In the display area 53c, the allocation situation of RBs is represented as a graph by the subframe numbers 0 to 9, and, it is represented in a graph and a text that the cursor is currently positioned at slot 7 of the third subframe.

The display area 53e represents that markers 51d and 52b are located at symbol 0. In addition, it is represented that the EVM measurement value of the symbol represented by the markers 51d and 52b is 3.41%.

Figure 8:
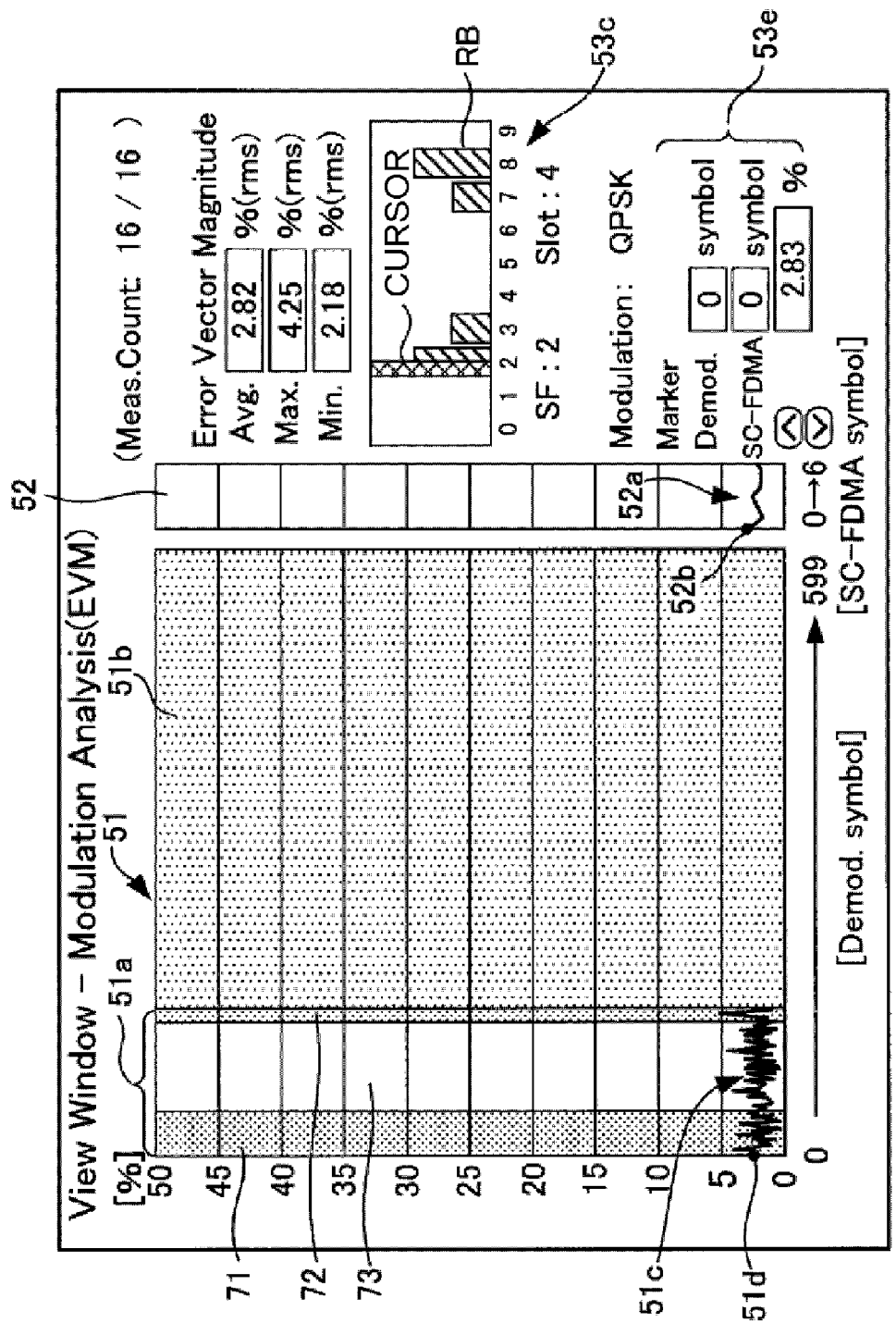
FIG. 8 is an example in which an EVM measurement result of a slot 4 is displayed by a display unit of a mobile communication terminal testing apparatus according to an embodiment of the present invention.

Next, the display example of the EVM measurement result for slot 4 is illustrated in FIG. 8. 12 RBs are allocated to slot 4, and an exclusion period of 25 µs is disposed to the head of the slot (see FIG. 2).

As illustrated in FIG. 8, similarly to the cases illustrated in FIGS. 6 and 7, in the display area 51, an allocation area 51a and a non-allocation area 51b are displayed in a distinguished manner, for example, by coloring them. Here, the width of the allocation area 51a in the horizontal-axis direction is 144 symbols (12 RBs×12 subcarriers) when represented by the number of demodulated symbols. On the other hand, the width of the non-allocation area 51b in the horizontal-axis direction is 456 symbols (38 RBs×12 subcarriers) when represented by the number of demodulated symbols.

In the allocation area 51a, an EVM graph 51c that represents the EVM measurement results of the demodulated symbols 0 to 143 is drawn. Here, a marker 51d is allocated to demodulated symbol 0.

In addition, in the allocation area 51a, exclusion periods 71 and 72 and a measurement period 73 are displayed. In slot 4, an exclusion period of 25 µs is arranged in the head of the time domain (see FIG. 2), and, as described above, when the channel bandwidth of the LTE is set to 10 MHz, the exclusion period 71 on the head side includes 44 symbols, and the exclusion period 72 on the tail side includes 10 symbols. In addition, a period acquired from excluding the exclusion periods 71 and 72 from the allocation area 51a is the measurement period 73.

In the display area 52, an EVM graph 52a that represents the EVM measurement results of SC-FDMA symbols (0 to 6) is drawn. Here, a marker 52b is allocated to SC-FDMA symbol 0.

In the display area 53c, the allocation situation of RBs is represented as a graph by the subframe numbers 0 to 9, and, it is represented in a graph and a text that the cursor is currently positioned at slot 4 of the second subframe.

The display area 53e represents that markers 51d and 52b are located at symbol 0. In addition, it is represented that the EVM measurement value of the symbol represented by the markers 51d and 52b is 2.83%.

As described in the display examples illustrated as above, the display unit 43 according to this embodiment can display the EVM measurement result (a numeric value and a graph) of each slot and can display a graph or the like that represents the allocation area, the non-allocation area, the exclusion period, and the allocation situation.

Figure 9:
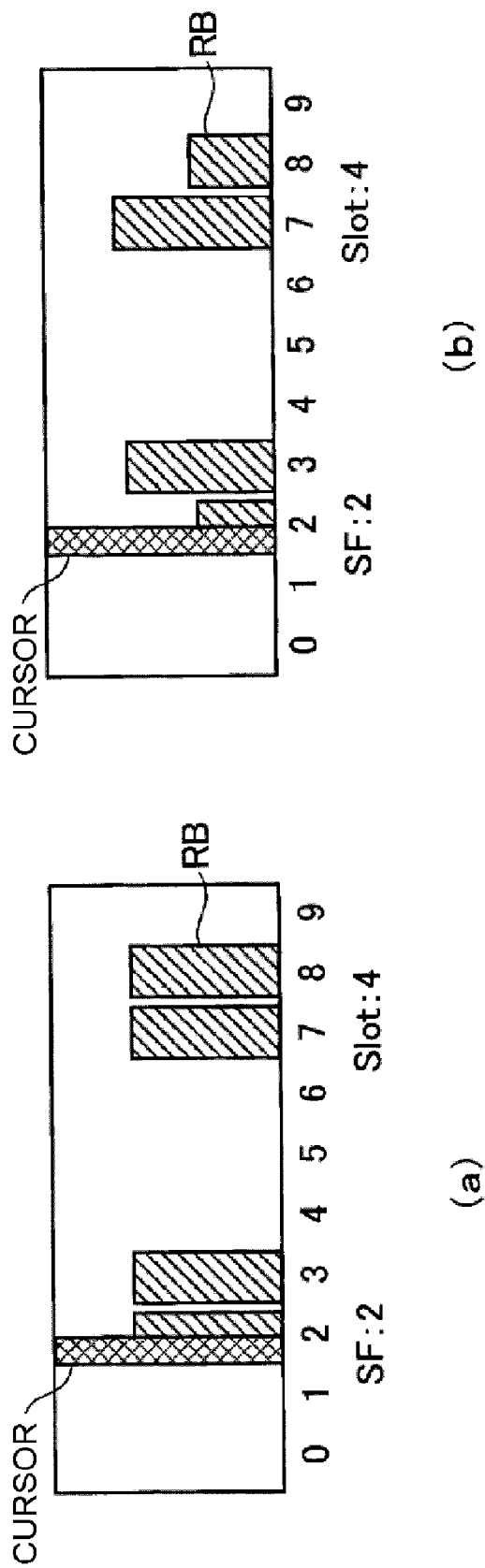
FIG. 9 is a diagram illustrating the states of RB allocation for each subframe as a graph in a mobile communication terminal testing apparatus according to an embodiment of the present invention.

In addition, since the display unit 43 according to this embodiment is configured to display the allocation situation of RBs for each subframe as a graph in the above-described display area 53c, for example, as illustrated in FIGS. 9(a) and (b), even when the number of RBs allocated to each slot is dynamically changed, a tester can intuitively check the allocation situation of RBs.

Figure 10:
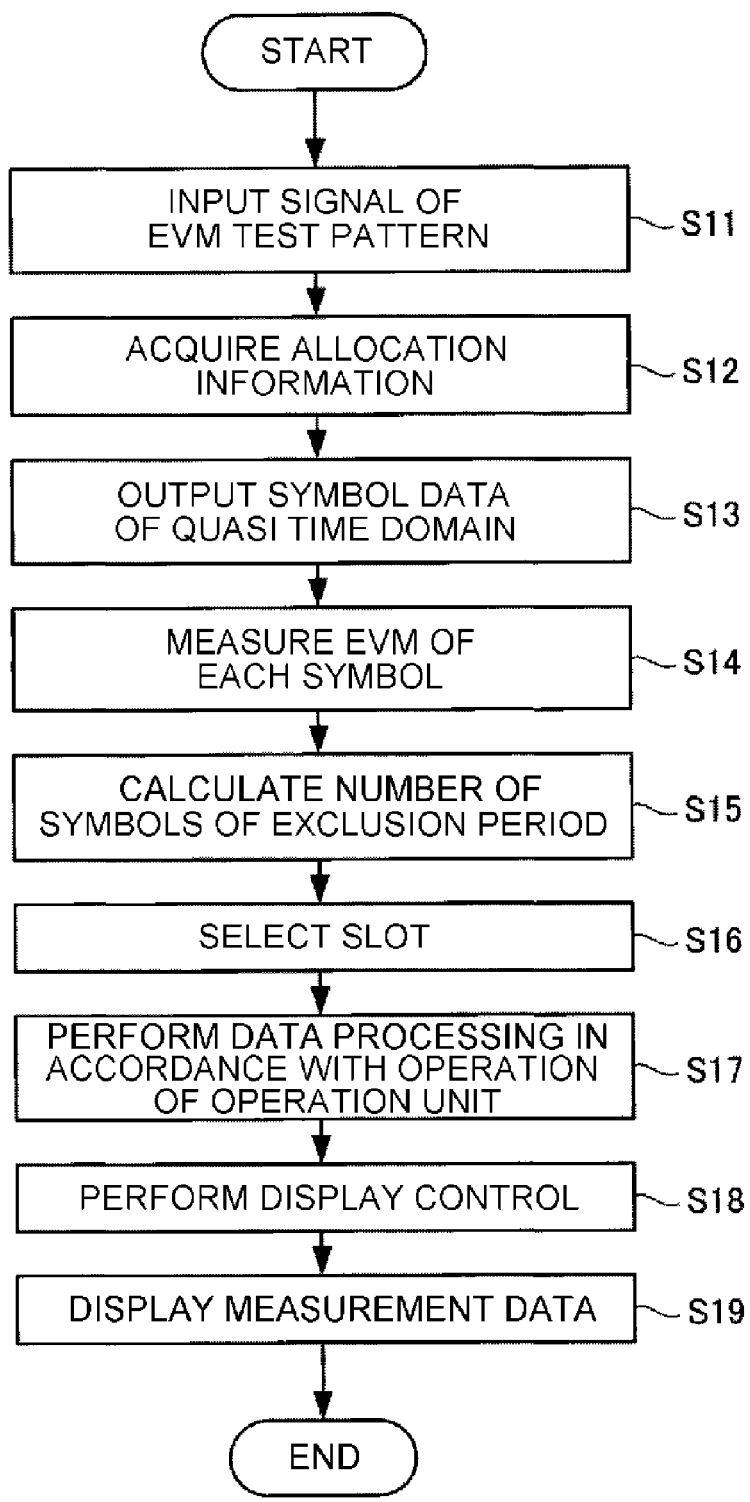
FIG. 10 is a flowchart of a mobile communication terminal testing apparatus according to an embodiment of the present invention.
Figure 12:
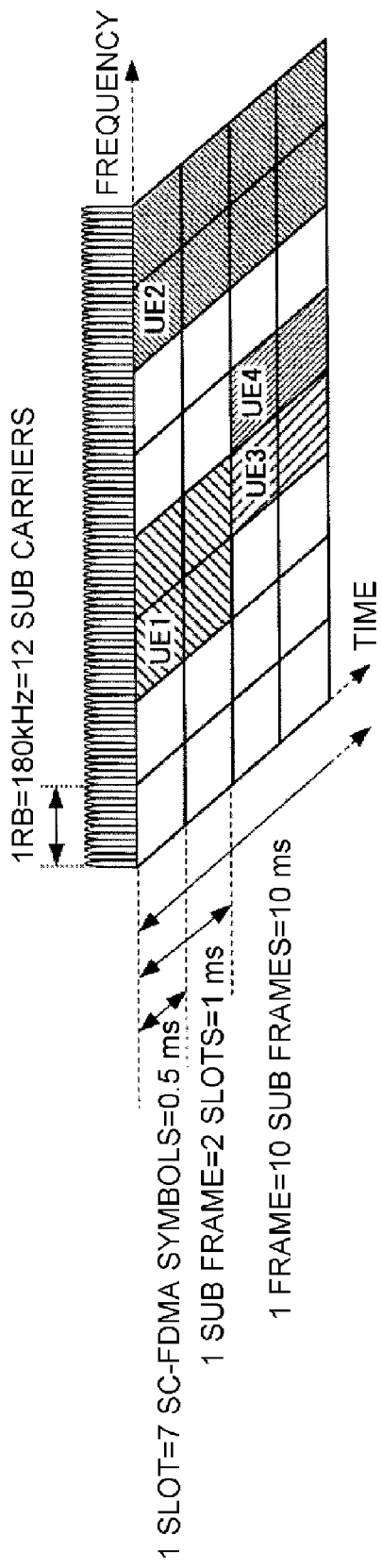
FIG. 12 is a schematic diagram illustrating a transmission format of a digital signal in SC-FDMA.

Next, the operation of the mobile communication terminal testing apparatus 1 according to this embodiment will be described with reference to FIG. 10.

The reception unit 12 receives a signal of the EVM test pattern, which is transmitted by the mobile communication terminal 2, through the coupler 13. Then, the reception unit 12 demodulates the received signal to be a baseband signal and converts the baseband signal into a digital value. The reception signal processing circuit 21 of the measurement unit 20 receives the signal of the EVM test pattern converted into the digital value (Step S11).

The allocation information acquiring section 23 acquires allocation information of the EVM test pattern from the control unit 14 (Step S12). Based on this allocation information, the EVM measuring circuit 22 can check that the EVM measurement targets are slots 4 to 7 and 14 to 17.

The reception signal processing circuit 21 performs signal processing such as an FFT process or an IDFT process for the signal of the EVM test pattern and outputs the symbol data of the quasi time domain (Step S13). Then, the EVM measuring circuit 22 measures the EVM for each symbol output by the reception signal processing circuit 21 (Step S14).

More specifically, the EVM measuring circuit 22 acquires information of the modulation scheme of the EVM test pattern transmitted by the mobile communication terminal 2 from the control unit 14 and acquires a constellation in which the symbol data is represented in the IQ coordinates in accordance with the modulation scheme. Next, the EVM measuring circuit 22 measures an EVM between each symbol data measuring point the acquired constellation and the logical point of the symbol data in the logical constellation for each slot and stores the measured EVM data in the measurement data storing section 25.

The exclusion period calculating section 24 acquires the time information of the exclusion period (time domain) from the control unit 14 and calculates the number of symbols included in the exclusion period based on the measurement conditions set by the operation unit 30 to be described later and the above-described calculation equation described in "E.7.4 Formula" (Step S15) and stores data of the calculated number of symbols included in the exclusion period in the measurement data storing section 25.

The slot selecting section 32 allows a tester to select one of slots 4 to 7 and 14 to 17 by using the operation button 61 (Step S16) and outputs information of the slot selected by the tester to the measurement data processing unit 41 and the display control unit 42.

The measurement data processing unit 41 reads out data stored in the measurement data storing section 25 and performs predetermined data processing in accordance with the operation of the operation unit 30 (Step S17). For example, the measurement data processing unit 41 calculates an average value of the EVMs for each slot at a predetermined measurement count or an average value of the entire EVMs (corresponding to 16 slots to be described later).

The display control unit 42 performs display control for displaying the data processed by the measurement data processing unit 41 on the display unit 43 in accordance with an operation of the operation unit 30 (Step S18).

The display unit 43 displays the data output by the display control unit 42 (Step S19).

Next, regarding the calculation of the average value of EVMs, this embodiment and a conventional technique will be compared. First, according to the conventional technique, as illustrated on the upper side of FIG. 11, 8 signals at slots 4 to 7 and 14 to 17 are measured for 2 frames, and an average value of EVMs corresponding to a total of 16 slots is collectively acquired. However, according to this technique, since an average value of the EVMs corresponding to 16 slots is collectively acquired, it is difficult to represent the values of EVMs of individual slots to the tester.

In contrast to this, in the mobile communication terminal testing apparatus 1 according to this embodiment, as illustrated in the lower side of FIG. 11, 8 signals at slots 4 to 7 and 14 to 17 are measured for two frames for each slot, an average value of the EVMs is acquired for each slot, and the values thereof can be displayed. Therefore, according to the mobile communication terminal testing apparatus 1, by displaying a measured value of the EVM for each slot, a detailed analysis, the detection of a defect, or the like in the development stage of the mobile communication terminal or the evaluation stage thereof in the manufacturing line can be assisted.

As described above, according to the mobile communication terminal testing apparatus 1 of this embodiment, the display unit 43 is configured to display the EVM of each symbol included in the slot selected by the slot selecting section 32, and accordingly, the EVM can be displayed for each slot.

In addition, since the mobile communication terminal testing apparatus 1 according to this embodiment displays the allocation area 51a, the non-allocation area 51b, the exclusion periods 71 and 72, and the measurement period 73, which are different for each slot, in a distinguished manner for each slot, such areas or periods can be easily perceived by the tester.

Furthermore, since the mobile communication terminal testing apparatus 1 according to this embodiment displays the graph screen of the EVMs for each slot, the EVM measurement value of each symbol for each slot can be easily perceived by the tester.

INDUSTRIAL APPLICABILITY

As described above, the mobile communication terminal testing apparatus and a method of testing a mobile communication terminal according to the present invention have an advantage of being capable of displaying the EVM for each slot and are useful as a mobile communication terminal testing apparatus and a method of testing a mobile communication terminal for testing a mobile communication terminal such as a cellular phone or a mobile terminal.

DESCRIPTION OF REFERENCE NUMERALS AND SIGNS 1 mobile communication terminal testing apparatus
2 mobile communication terminal
10 pseudo base station
11 transmission unit
12 reception unit (reception signal outputting means)
13 coupler
13a, 13b, and 13c terminal
14 control unit
20 measurement unit
21 reception signal processing circuit
22 EVM measuring circuit (modulation accuracy measuring means)
23 allocation information acquiring section
24 exclusion period calculating section
25 measurement data storing section
30 operation unit
31 measurement condition setting section
32 slot selecting section (slot selecting means)
33 marker operating section
41 measurement data processing unit
42 display control unit
43 display unit (display means)
51, 52, 53 (53a to 53e), and 54 (54a and 54b) display area
51a allocation area
51b non-allocation area
51c and 52a EVM graph
51d and 52b marker 60 (61 and 62) operation button
71 and 72 exclusion period

The invention claimed is:

1. A mobile communication terminal testing apparatus that tests a mobile communication terminal that transmits or receives a signal of a radio frequency which includes a plurality of slots delimited at a predetermined time interval, each of the slot including a plurality of symbols modulated according to a predetermined modulation scheme, the mobile communication terminal testing apparatus comprising:
reception signal outputting means that receives a transmission signal of the radio frequency from the mobile communication terminal, converts the transmission signal into a baseband signal, and outputs the baseband signal;
modulation accuracy measuring means that measures modulation accuracy of each of the plurality of symbols included in the baseband signal;
slot selecting means that selects at least one of the plurality of slots; and
display means that displays the modulation accuracy of each of the plurality of symbols included in the slot that is selected by the slot selecting means
wherein the modulation accuracy measuring means measures the modulation accuracy of a measurement target symbol set in advance out of the plurality of symbols included in the slot, and
wherein the mobile communication terminal transmits the transmission signal in which a plurality of the symbols modulated according to the predetermined modulation scheme are allocated to areas set in advance in both time domain and frequency domain.

2. The mobile communication terminal testing apparatus according to claim 1, wherein the display means displays modulation accuracy graphs of the plurality of symbols included in the slot selected by the slot selecting means.

3. The mobile communication terminal testing apparatus according to claim 2, and
wherein the display means displays a display area in which a measurement period having the measurement target symbol included therein and exclusion periods having no measurement target symbol included therein are displayed in a distinguished manner.

4. The mobile communication terminal testing apparatus according to claim 3,
wherein the display means displays a display area in which an allocation area, to which the transmission signal is allocated, and a non-allocation area other than the allocation area are displayed in a distinguished manner.

5. The mobile communication terminal testing apparatus according to claim 4, wherein the display means displays a display area of a graph that represents the allocation number of the allocation areas to which the transmission signal is allocated for each slot and allows the slot selecting means to select an arbitrary slot.

6. The mobile communication terminal testing apparatus according to claim 2,
wherein the mobile communication terminal transmits the transmission signal in which a plurality of the symbols modulated according to the predetermined modulation scheme are allocated to areas set in advance in both time domain and frequency domain, and
wherein the display means displays a display area in which an allocation area, to which the transmission signal is allocated, and a non-allocation area other than the allocation area are displayed in a distinguished manner.

7. The mobile communication terminal testing apparatus according to claim 6, wherein the display means displays a display area of a graph that represents the allocation number of the allocation areas to which the transmission signal is allocated for each slot and allows the slot selecting means to select an arbitrary slot.

8. The mobile communication terminal testing apparatus according to claim 1,
wherein the modulation accuracy measuring means measures the modulation accuracy of a measurement target symbol set in advance out of the plurality of symbols included in the slot, and
wherein the display means displays a display area in which a measurement period having the measurement target symbol included therein and exclusion periods having no measurement target symbol included therein are displayed in a distinguished manner.

9. The mobile communication terminal testing apparatus according to claim 8,
wherein the mobile communication terminal transmits the transmission signal in which a plurality of the symbols modulated according to the predetermined modulation scheme are allocated to areas set in advance in both time domain and frequency domain, and
wherein the display means displays a display area in which an allocation area, to which the transmission signal is allocated, and a non-allocation area other than the allocation area are displayed in a distinguished manner.

10. The mobile communication terminal testing apparatus according to claim 9, wherein the display means displays a display area of a graph that represents the allocation number of the allocation areas to which the transmission signal is allocated for each slot and allows the slot selecting means to select an arbitrary slot.

11. The mobile communication terminal testing apparatus according to claim 1,
wherein the mobile communication terminal transmits the transmission signal in which a plurality of the symbols modulated according to the predetermined modulation scheme are allocated to areas set in advance in both time domain and frequency domain, and
wherein the display means displays a display area in which an allocation area, to which the transmission signal is allocated, and a non-allocation area other than the allocation area are displayed in a distinguished manner.

12. The mobile communication terminal testing apparatus according to claim 11, wherein the display means displays a display area of a graph that represents the allocation number of the allocation areas to which the transmission signal is allocated for each slot and allows the slot selecting means to select an arbitrary slot.

13. A method of testing a mobile communication terminal that transmits or receives a signal of a radio frequency which includes a plurality of slots delimited at a predetermined time interval, each of the slot including a plurality of symbols modulated according to a predetermined modulation scheme, the method comprising:
receiving a transmission signal of the radio frequency from the mobile communication terminal, converting the transmission signal into a baseband signal, and inputting the baseband signal;
measuring modulation accuracy of each of the plurality of symbols included in the baseband signal;
selecting at least one of the plurality of slots; and
displaying the modulation accuracy of each of the plurality of symbols included in the slot that is selected in the selecting of at least one of the plurality of slots, wherein, in the measuring of the modulation accuracy, the modulation accuracy of a measurement target symbol set in advance out of the plurality of symbols included in the slot is measured, and wherein the mobile communication terminal transmits the transmission signal in which a plurality of the symbols modulated according to the predetermined modulation scheme are allocated to areas set in advance in both time domain and frequency domain.

14. The method according to claim 13, wherein, in the displaying of the modulation accuracy, modulation accuracy graphs of the plurality of symbols included in the slot selected in the selecting of at least one of the plurality of slots are displayed.

15. The method according to claim 14,
wherein, in the displaying of the modulation accuracy, a display area is displayed in which a measurement period having the measurement target symbol included therein and exclusion periods having no measurement target symbol included therein are displayed in a distinguished manner.

16. The method according to claim 15,
wherein, in the displaying of the modulation accuracy, a display area in which an allocation area, to which the transmission signal is allocated, and a non-allocation area other than the allocation area are displayed in a distinguished manner is displayed.

17. The method according to claim 16, wherein, in the displaying of the modulation accuracy, a display area of a graph that represents the allocation number of the allocation areas to which the transmission signal is allocated for each slot is displayed, and an arbitrary slot is selected in the selecting of at least one of the plurality of slots.

18. The method according to claim 14,
wherein the mobile communication terminal transmits the transmission signal in which a plurality of the symbols modulated according to the predetermined modulation scheme are allocated to areas set in advance in both time domain and frequency domain, and
wherein, in the displaying of the modulation accuracy, a display area in which an allocation area, to which the transmission signal is allocated, and a non-allocation area other than the allocation area are displayed in a distinguished manner is displayed.

19. The method according to claim 18, wherein, in the displaying of the modulation accuracy, a display area of a graph that represents the allocation number of the allocation areas to which the transmission signal is allocated for each slot is displayed, and an arbitrary slot is selected in the selecting of at least one of the plurality of slots.

20. The method according to claim 13,
wherein, in the measuring of the modulation accuracy, the modulation accuracy of a measurement target symbol set in advance out of the plurality of symbols included in the slot is measured, and
wherein, in the displaying of the modulation accuracy, a display area is displayed in which a measurement period having the measurement target symbol included therein and exclusion periods having no measurement target symbol included therein are displayed in a distinguished manner.

21. The method according to claim 20,
wherein the mobile communication terminal transmits the transmission signal in which a plurality of the symbols modulated according to the predetermined modulation scheme are allocated to areas set in advance in both time domain and frequency domain, and
wherein, in the displaying of the modulation accuracy, a display area in which an allocation area, to which the transmission signal is allocated, and a non-allocation area other than the allocation area are displayed in a distinguished manner is displayed.

22. The method according to claim 21, wherein, in the displaying of the modulation accuracy, a display area of a graph that represents the allocation number of the allocation areas to which the transmission signal is allocated for each slot is displayed, and an arbitrary slot is selected in the selecting of at least one of the plurality of slots.

23. The method according to claim 13,
wherein the mobile communication terminal transmits the transmission signal in which a plurality of the symbols modulated according to the predetermined modulation scheme are allocated to areas set in advance in both time domain and frequency domain, and
wherein, in the displaying of the modulation accuracy, a display area in which an allocation area, to which the transmission signal is allocated, and a non-allocation area other than the allocation area are displayed in a distinguished manner is displayed.

24. The method according to claim 23, wherein, in the displaying of the modulation accuracy, a display area of a graph that represents the allocation number of the allocation areas to which the transmission signal is allocated for each slot is displayed, and an arbitrary slot is selected in the selecting of at least one of the plurality of slots.

* * * * *